United States Patent [19]

Lai

[11] Patent Number: 5,504,914

[45] Date of Patent: Apr. 2, 1996

[54] MULTI-LEVEL INSTRUCTION BOOSTING METHOD USING PLURALITY OF ORDINARY REGISTERS FORMING PLURALITY OF CONJUGATE REGISTER PAIRS THAT ARE SHADOW REGISTERS TO EACH OTHER WITH DIFFERENT ONLY IN MSB

[75] Inventor: Feipei Lai, Chang-Hwa, Taiwan

[73] Assignee: National Science Council, Taipei, Taiwan

[21] Appl. No.: 82,130

[22] Filed: Jun. 23, 1993

[51] Int. Cl.$^6$ .................................................. G06F 15/16
[52] U.S. Cl. ...................... 395/800; 395/375; 364/231.6; 364/231.8; 364/261.3; 364/280.4; 364/DIG. 1
[58] Field of Search .................................. 395/375, 500, 395/775, 400, 250, 800; 364/DIG. 1, DIG. 2

[56] References Cited

U.S. PATENT DOCUMENTS

| | | | |
|---|---|---|---|
| 4,374,418 | 2/1983 | Catiller et al. | 395/775 |
| 4,631,660 | 12/1986 | Woffinden et al. | 395/400 |
| 4,807,115 | 2/1989 | Torng | 395/800 |
| 4,965,720 | 10/1990 | Mitchell et al. | 395/400 |
| 5,021,993 | 6/1991 | Matoba et al. | 395/775 |
| 5,155,817 | 10/1992 | Kishigami et al. | 395/375 |
| 5,224,063 | 6/1993 | Matsonaga | 364/726 |
| 5,355,460 | 10/1994 | Eickemeyer et al. | 395/375 |
| 5,396,640 | 3/1995 | Ikenaga et al. | 395/800 |

OTHER PUBLICATIONS

Michael D. Smith et al, " Boosting Beyond Static Scheduling in a Superscalar Processor", May 1990 IEEE, Stanford University, Computer System Laboratory, pp. 344–354.

Michael D. Smith et al, "Efficient Superscalar Performance Through Boosting", Oct. 1992, Computer System Laboratory, Stanford University, 1992 ACM, pp. 248–259.

Komukai Toshiba; "Twin Register Architecture for an AL Processor"; 1989 IEEE, pp. 168–173.

Primary Examiner—Meng-Ai An
Attorney, Agent, or Firm—Townsend and Townsend and Crew

[57] ABSTRACT

An instruction multi-level boosting method in a compiler has the step of providing a plurality of ordinary registers to act as the destination registers for access by the ordinary instructions. At least one instruction is boosted and speculatively executed. The boosting method also has the step of providing a plurality of special registers corresponding to the ordinary registers, and acting as the destination registers for access by the boosted and speculatively executed instruction. Then, at the original position of the boosted instruction, the address of at least one ordinary register used in the boosted instruction is translated into the address of at least one corresponding special register. In this way, the compiler efficiency can be incressed; the need of requiring additional registers is lowered; and the cost thereof is reduced down because no complicated duplicating circuit is needed.

14 Claims, 7 Drawing Sheets

MULTI-LEVEL INSTRUCTION BOOSTING METHOD USING PLURALITY OF ORDINARY REGISTERS FORMING PLURALITY OF CONJUGATE REGISTER PAIRS THAT ARE SHADOW REGISTERS TO EACH OTHER WITH DIFFERENT ONLY IN MSB

FIELD OF THE INVENTION

The present invention relates generally to an instruction multi-level boosting method in a compiler, and more particularly to an instruction multi-level boosting method which can enhance the parallelization of the instruction level in a superscalar microprocessor which can send out and execute more than one instruction within one cycle.

BACKGROUND OF THE INVENTION

At present, the superscalar architecture dominates over the advanced microprocessor field. The superscalar microprocessor architecture can send out and execute more than one instruction within one cycle to improve its performance. The key technique, however, is how to develop the parallelization of the instruction level.

The prior approach is to find the instructions capable of being executed in parallel within each basic block. The term of "basic block" is defined as the instruction region from one branch instruction to the next branch instruction. However, such an approach is limited by some problems such as the dependency of data, the conflict between resources, and the control branch problem, and thus cannot obtain a large parallel gain.

The statistical average number of the instructions in one basic block is only 12–16 or so. Therefore, the superscalar microprocessor cannot generally exhibit its full potential performance if it only utilizes the parallelization in individual basic block.

In order to enhance the performance, a speculative execution method is proposed. In this method, some instructions which are assumed to be determined later whether to be executed or not to be executed by the results of their related control branch instructions are speculatively executed before the results of the branch instructions come out. Since the speculative execution technique can eliminate the dependency resulted from the branch instruction, the superscalar microprocessor can simultaneously execute the instructions which come from different basic blocks to significantly enhance the available parallelization in a program.

Further, the Stanford University has proposed an instruction boosting concept which utilizes the shadow register file to allow the instruction boost between adjacent basic blocks, so that the parallelization among the instructions is enhanced, Referring to FIGS. 1, 2a and 2b, FIG. 1 shows the contents of three basic blocks 10, 12, and 14 before boosted, and FIG. 2a shows that an instruction "r4:=r3+r6" in the basic block 12' (LAB1) is boosted into the upper-level basic block 10'. In this situation, the output destination register must be changed into r4.S which is the shadow register of r4, as shown in FIG. 2b. After the branch instruction "beq.t r1, LAB 1" in the basic block 10' is executed, r4.S will be duplicated into the r4 position of the sequential register file 16 or alternatively be discarded, depending upon the result of the branch instruction. This technique, however, needs one shadow register file to support one-level boosting, and thus the hardware complexity is very high. Referring to FIGS. 3a and 3b, there is shown that two shadow register files are needed to support two-level instruction boosting (shown by two dotted arrows in FIG. 3a). The register r4 utilizes the shadow register file (r4.S1) to support one level boosting, and the register r6 utilizes the shadow register file (r6.S2) to support another level boosting, and the register r6 utilized the shadow register file (r6.S2) to support another level boosting. In this instruction boosting method, most of the registers are seldom in use, and the complexity of the duplicating circuits will severely affect the circuit design of the sequential register file. Therefore, its entire performance/cost are not as desired.

SUMMARY OF THE INVENTION

The primary object of the present invention is to provide a high-efficient compiler.

Another object of the present invention is to provide an instruction multi-level boosting method in a compiler, which needs only a small amount of additional registers to enhance the performance of the compiler.

A further object of the present invention is to provide an instruction multi-level boosting method in a compiler, which does not need a complicated duplicating circuit.

Yet another object of the present invention is to provide an instruction multi-level boosting method in a compiler, which can increase the efficiency of the compiler, and lower the cost thereof.

In accordance with the present invention, an instruction multi-level boosting method in a compiler includes the following steps of: providing a plurality of ordinary registers to act as the destination registers for access by the ordinary instructions; boosting and speculatively executing at least one instruction; providing a plurality of special registers corresponding to the ordinary registers, and acting as the destination registers for access by the boosted and speculatively executed instruction; and at the original position of the boosted instruction, translating the address of at least one ordinary register used with the boosted instruction into the address of at least one corresponding special register.

In accordance with one aspect of the present invention, the ordinary registers and the corresponding special registers form a plurality of conjugate register pairs, and can be the shadow registers with each other. The addresses of each one conjugate register pair are different only in one bit, and the one bit may be the most significant bit.

In accordance with another aspect of the present invention, the architecture for executing the compiler includes an address translation circuit to translate the addresses between the ordinary and special registers. The address translation circuit is constituted by logic gates or an XOR gate. The architecture may further include a semantic register having a plurality of bits, each corresponding to one of the conjugate register pair respectively, and being utilized to determine whether the address translation circuit should be subjected to the address translating operation. The compiler may further include a boosting boundary register having a plurality of bits, each corresponding to one of the conjugate register pair and one bit of the semantic register, respectively, and the bit values of the boosting boundary register are utilized to affect the bit values of the semantic register respectively.

In accordance with further aspect of the present invention, the compiler includes an exclusive-OR boosting boundary register (XOR BBR) operation for the bit values of the boosting boundary register to affect the bit values of the semantic register. The compiler may include a plurality of boosting instructions to determine the bit values of the boosting boundary register so as to then affect the operation of the address translation circuit. The boosting instructions include a set boosting boundary register (Set BBR) instruction and a reset boosting boundary register (Reset BBR) instruction. The set boosting boundary register instruction can be placed at the original position of the boosted instruction to actuate the operation of the address translation circuit. The boosting instructions can replace the position of the NOP (No Operation) instruction of the compiler in order not to increase the instruction parcel number.

In accordance with yet another aspect of the present invention, the special and ordinary registers can be used as two independent register groups to store irrelevant variables if there is no speculatively executed instruction.

The present invention can be more fully understood by reference to the following description and accompanying drawings, which form an integral part of this application:

DETAILED DESCRIPTION OF THE PREFERRED EMBODIMENTS

The present invention provides an instruction multi-level boosting method for a compiler. This method is mainly characterized in that only one special register file is needed to combine with one ordinary register file to form a conjugate register file, and that the register identifier of the instructions in a program must be translated to an actual register address through a semantic register before we can access the registers. These characteristics will be described in detail hereinafter.

In a normal situation, two register files, i.e. the special and ordinary register files, of the conjugate register file could be used as two independent register files to store irrelevant variables. In supporting an instruction boosting, one of the register files, i.e. the ordinary register file, acts as a sequential register file to store sequential results of the instructions while the other register file, i.e. the special register file, acts as a shadow register file to store speculative results of boosted instructions.

A boosting boundary register BBR may be provided, and its bit values can be controlled by a plurality of boosting instructions, such as Set BBR, Reset BBR, and XOR BBR. The boosting instructions can replace the NOP (No Operation) instruction of the microprocessor without increasing the number of the instruction parcel. The boosting boundary register can utilize a circuit device, for example an exclusive-OR circuit, to affect the bit values of the semantic register. Then, the semantic register controls the register identifier to obtain an actually desired address. Therefore, the semantic register and the Set BBR instruction, as well as the result of the branch instruction can be utilized to determine whether the result of the speculatively executed instruction should be remained or discarded. In this way, software can be used to achieve the multi-level boosting.

As to hardware, the present invention does not need an additional shadow register file. In a superscalar microprocessor which is able to send out four instructions at a time, the number of effectively executed instructions is about 2 or so. Therefore, the present invention can insert the Set BBR instruction to replace the NOP (No Operation) instruction without increasing the instruction parcel.

Figure 8:
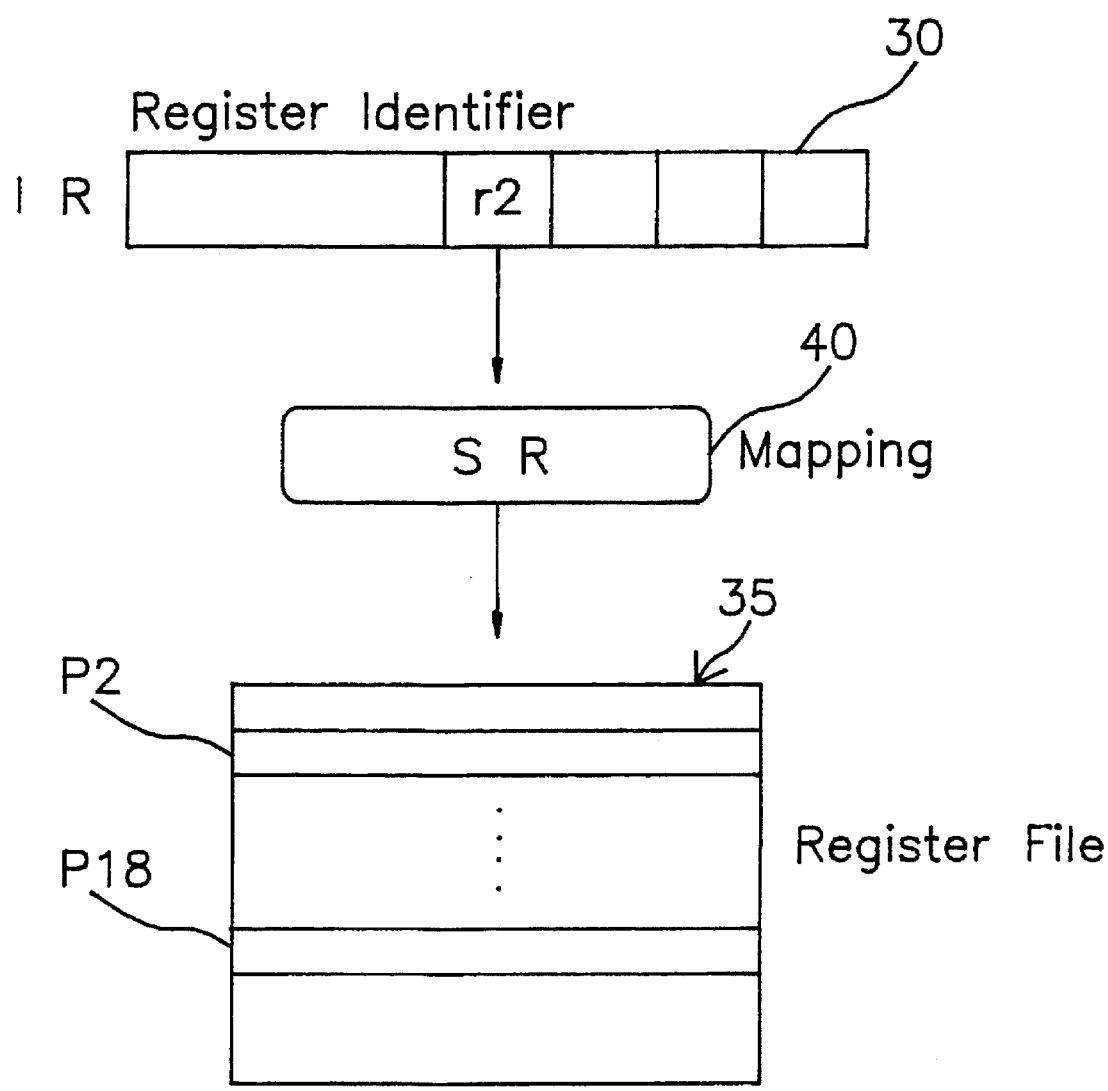
FIG. 8 is a schematic diagram showing that a register identifier is mapped to a register file through the semantic register, according to a preferred embodiment of the present invention.

The operations of the present method are as follows: In a set of registers, for example 2X or 2 registers, every two registers the addresses of which are different only in the most significant bit (or any other bit) are called a conjugate register pair. With reference to FIG. 8, it is supposed that the address of the register includes five bits. The registers P2 and P18 in a register file 35 are called a conjugate register pair. The address of the register r2 in the register identifier 30 can be mapped to the position P2 or P18 through the control of the semantic register 40. The control manner will be described in detail later.

That is to say, there are X or 2 ordinary registers and X or 2 special registers to form X or 2 conjugate register pairs. Also, the boosting boundary register with X or 2 bits, and the semantic register with X or 2 bits are needed. Each bit of the boosting boundary register and the semantic register is corresponding to one of the conjugate register pair, respectively. For example, let us suppose that a register file includes 32 registers. The registers r0–r15 are the ordinary registers while the registers r16–r31 are the special registers. The registers r3 and r19 are a conjugate register pair, i.e. the register r3 can be the shadow register of the register r19, and vice versa. These are shown in Fig.4 and listed as follows:

| *Semantic Bit (r3/r19) = 0 | | |
| --- | --- | --- |
| Register Identifier | r3 | r19 |
| Physical Location | p3 | p19 |
| *Semantic Bit (r3/r19) = 1 | | |
| Register Identifier | r3 | r19 |
| Physical Location | p19 | p3 |

Figure 1:
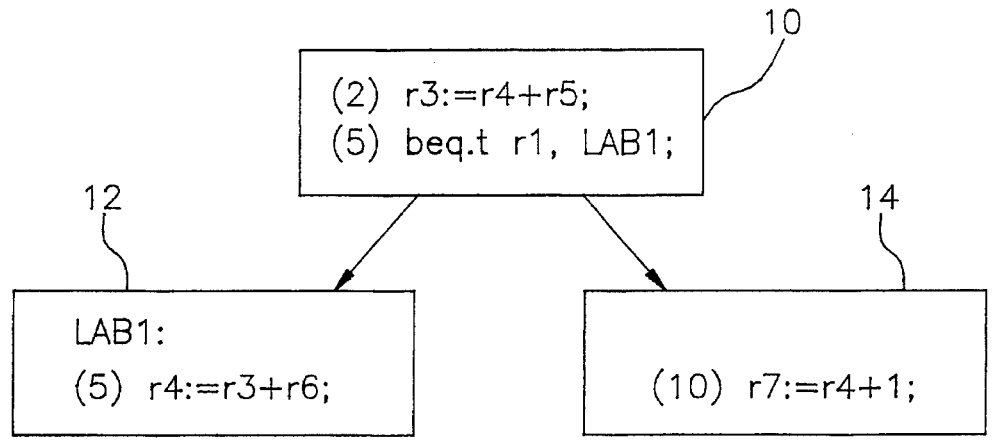
FIG. 1 is a schematic diagram of three basic blocks, showing their contents before boosted.
Figure 2A:
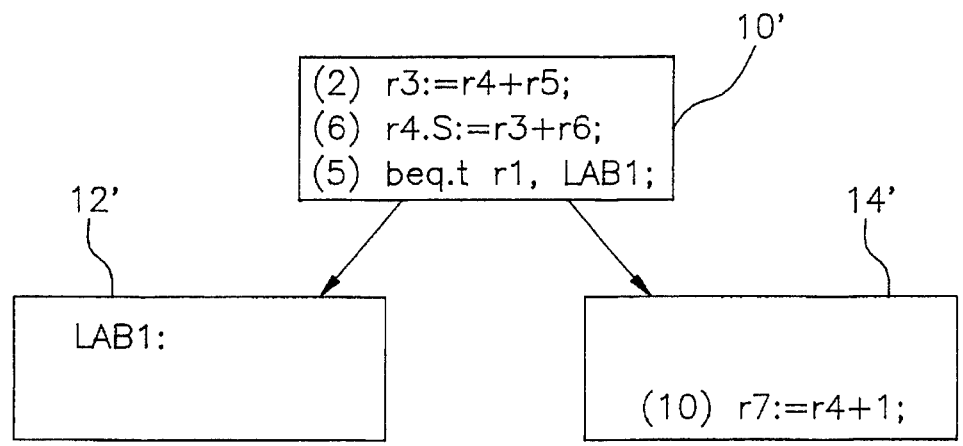
FIG. 2a is similar to FIG. 1, but showing the contents of basic blocks after boosted.
Figure 2B:
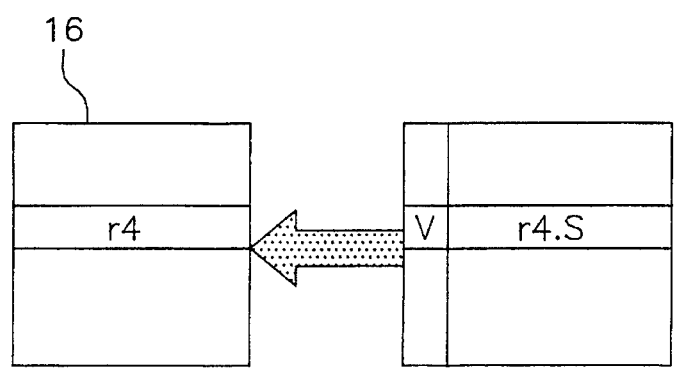
FIG. 2b is a schematic diagram of a sequential register file and a shadow register file used in the prior instruction boosting method.
Figure 3A:
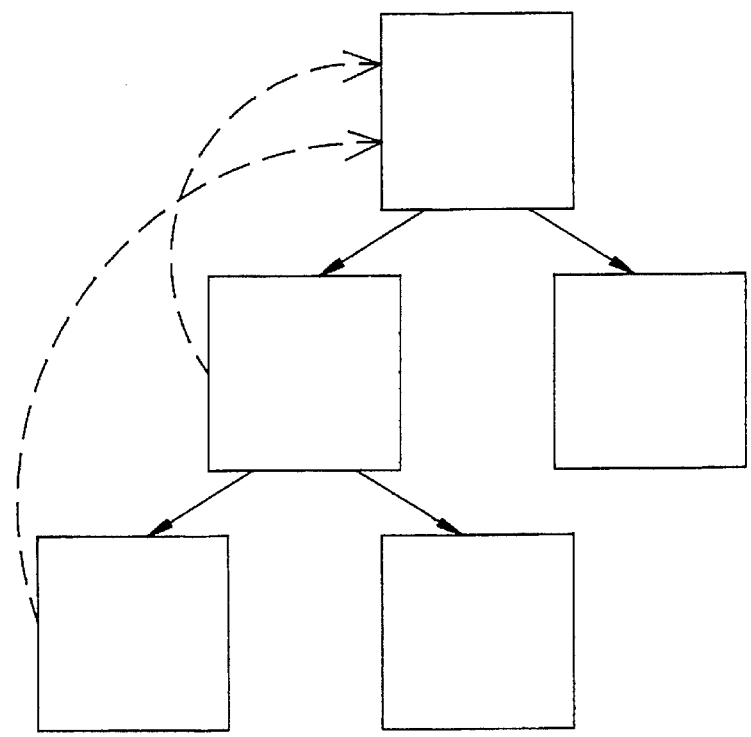
FIG. 3a is a schematic diagram of five basic blocks, showing two-level instruction boosting.
Figure 3B:
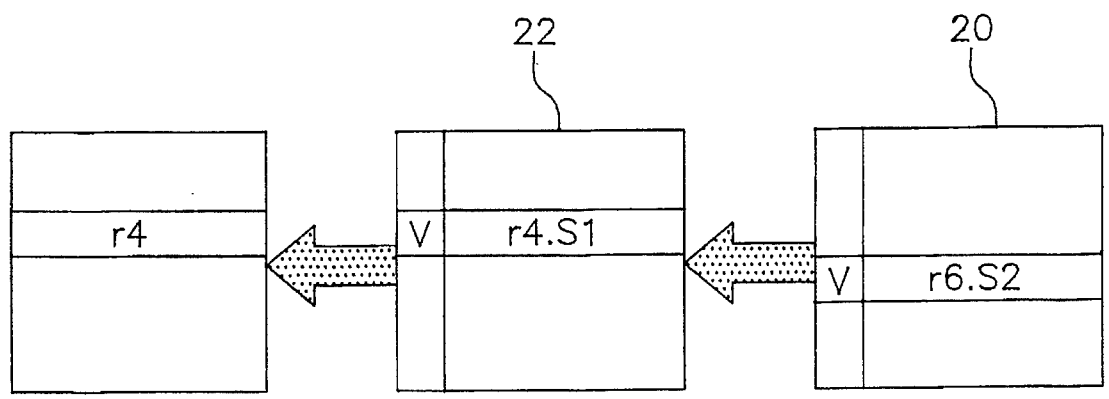
FIG. 3b is a schematic diagram of a sequential register file and two shadow register files used in the prior instruction boosting method.
Figure 4:
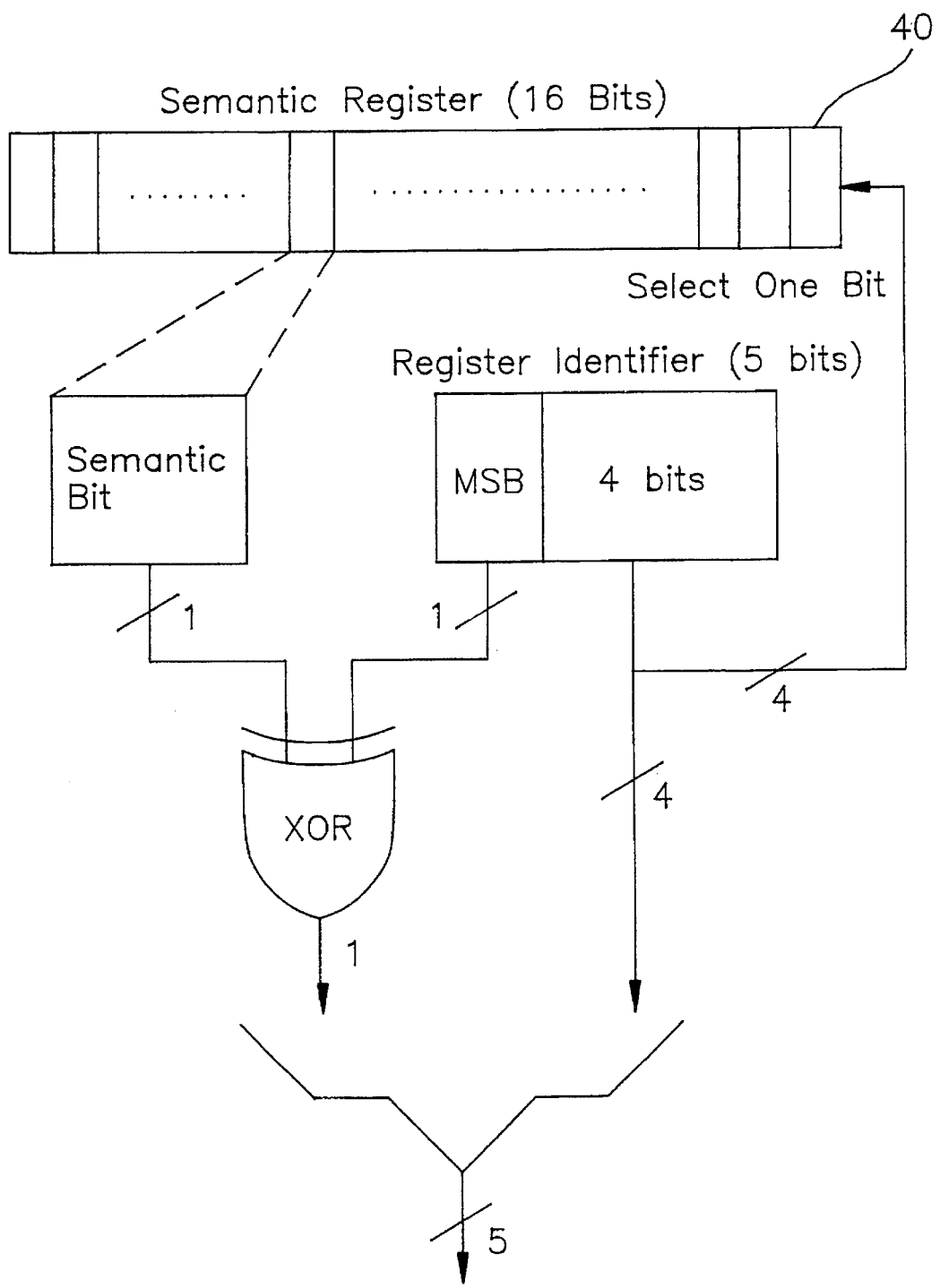
FIG. 4 is a schematic block diagram of an address translation circuit used in one preferred embodiment of the present invention.

In this way, the semantic register is utilized to affect the address translation circuit in FIG. 4, or the register identifier in order to obtain the actual mapping address of the register.

The address translation circuit can be implemented by logic gates or an XOR gate.

Figure 5:
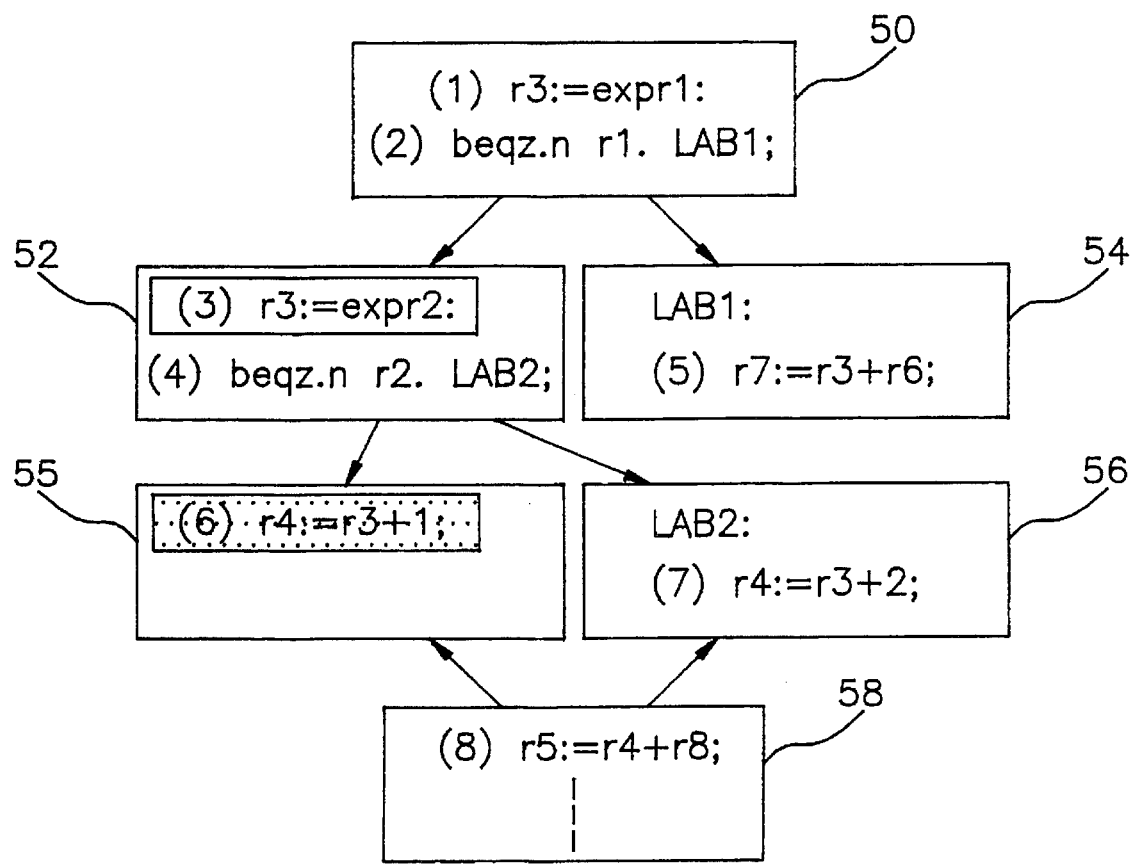
FIG. 5 is a schematic diagram of six basic blocks, showing their contents thereof before boosted for illustration of the present invention.
Figure 6:
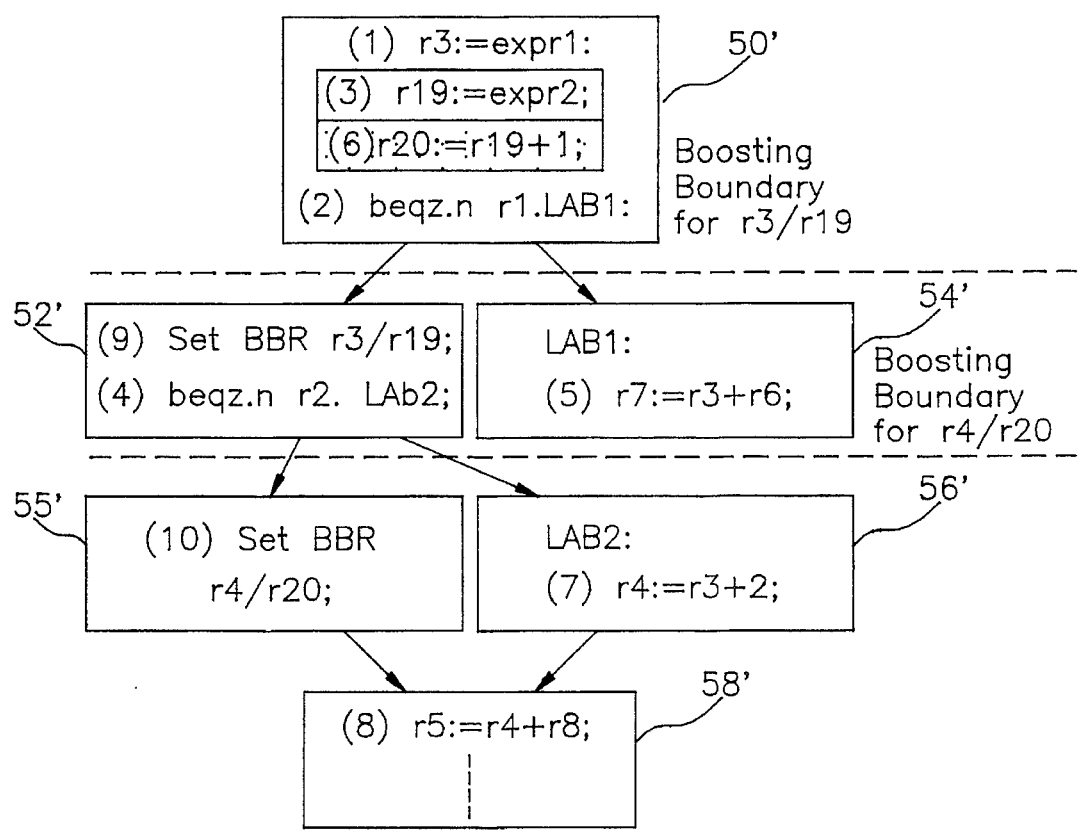
FIG. 6 is similar to FIG. 5, but showing the contents of basic blocks after two-level boosted.

If there is an output relationship between the boosted instruction and the instruction in the destination basic block, the destination register address of the boosted instruction is changed into the address of its shadow register, and the corresponding bit in the semantic register is set to "1". Referring to FIGS. 5 and 6, FIG. 5 shows the contents of six basic blocks 50, 52, 54, 55, 56, and 58 before boosted, and FIG. 6 shows the contents of six basic blocks 50', 52', 54', 55', 56', and 58' after boosted. The instruction "r3:=expr 2" in the basic block 52 is boosted into the basic block 50', and its original instruction position in the basic block 52' is replaced by an instruction "Set BBR r3/r19". The instruction "r4:=r3+1" in the basic block 55 is also boosted into the basic block 50', and its original instruction position in the basic block 55' is replaced by an instruction "Set BBR r4/r20". Also, the destination register addresses are changed from the addresses for the registers r3, and r4 into those for its conjugate register pairs r19, and r20. Thus, the branch instruction "beqz.n r1, LAB1" is a boosting boundary for r19 ("r3:=expr 2"), and the branch instruction "beqz.n r2, LAB 2" is a boosting boundary for r20 ("r4:=r3+1"). Totally only one Set BBR instruction is needed in one basic block if there is any instruction boosted.

Figure 7A:
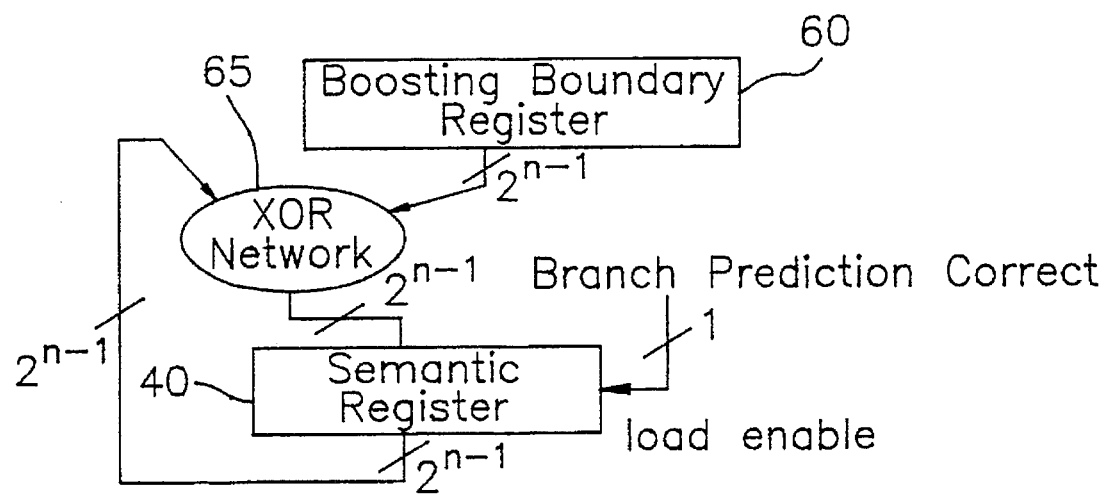
FIGS. 7a and 7b show an exclusive-OR circuit for a boosting boundary register to affect a semantic register, according to a preferred embodiment of the present invention.
Figure 7B:
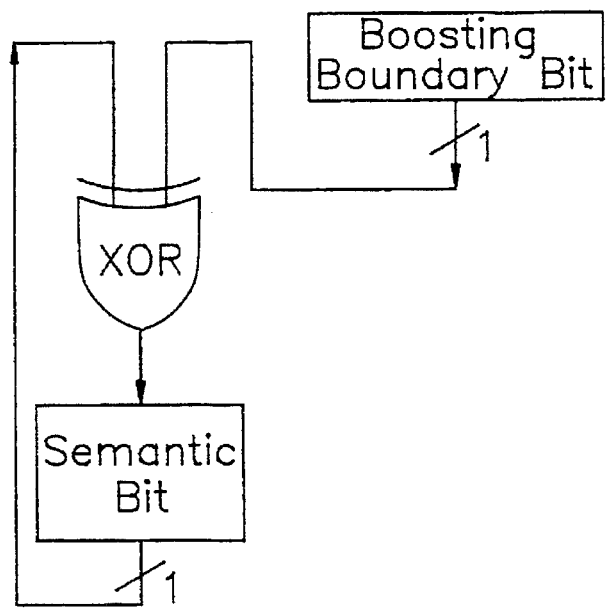

At the original positions of the boosted instructions, the third and fourth bits of the semantic register 40 are set to "1". That is to say, the instruction "Set BBR r3/r19" is added when it is sure that the basic block 52' will be executed. Referring to FIGS. 7a and 7b, the shown circuit will let both outputs of the semantic register 40 and the boosting boundary register 60 be sent to an exclusive-OR (or XOR) network 66. In this way, the semantic register 40 will allow access to the register r3 rather than access to the register r19. When it is sure that the basic block 55' will be executed, the instruction "Set BBR r4/r20" is added. The circuit of FIG. 7a will let the semantic register 40 and the boosting boundary register 60 undergo an XOR operation, so that the semantic register 40 changes the access to the register r4 into the access to the register r20.

In this way, the present method can increase the instructions capable of being executed in parallel within one basic block, for example the basic block 50' shown in FIG. 6. The instruction "Set BBR" can generally replace the NOP position without increasing the number of the instruction parcel. If the execution path finally does reach the original basic block of the boosted instruction, its corresponding bit value (which has been set to "1") in the semantic register 40 can be XORed with the register identifier 30 to translate the address into the address of the original destination register. If not, the speculative result is still kept in its shadow register, i.e. discarded.

With the conjugate register file, the present invention can only use one register file to support the multi-level instruction boosting, and simply needs only several bits (i.e. the boosting boundary register and the semantic register) and the simple address translation circuit (XOR).

While the invention has been described in terms of what are presently considered to be the most practical and preferred embodiments, it is to be understood that the invention needs not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An instruction multi level boosting method for a compiler comprising the following steps of:
   providing a plurality of ordinary registers to act as destination registers for access by ordinary instructions;
   boosting and speculatively executing at least one of said ordinary instructions;
   providing a plurality of special registers corresponding to said ordinary registers, said special registers acting as destination registers for access by at least one boosted and speculatively executed instruction, said ordinary registers and said corresponding special registers forming a plurality of conjugate register pairs that are shadow registers with respect to each other, and said conjugate register pairs being different only in one bit said one bit is the most significant bit;
   at an original position of said boosted instruction, translating an address of at least one of said ordinary registers used with said boosted instruction into an address of at least one corresponding special register; and
   providing an architecture for executing said compiler, said architecture including a semantic register with at least one bit value and a boosting boundary register with at least one bit value, the bit value of said boosting boundary register being utilized to influence the bit value of said semantic register to determine whether said address is translated from said at least one of said ordinary registers to said at least one corresponding special register.

2. A method as claimed in claim 1, wherein said architecture further includes an address translation circuit to execute said translation of addresses between said ordinary and special registers.

3. A method as claimed in claim 1, wherein said semantic register has a plurality of bits each of which corresponds to one of said conjugate register pairs, and being utilized to determine whether said address translation circuit should undergo said address translation step.

4. A method as claimed in claim 1, wherein said boosting boundary register has a plurality of bits each of which corresponds to one of said conjugate register pairs, each of said plurality of bits corresponding to one of said bits of said semantic register.

5. A method as claimed in claim 1, wherein said compiler executes an exclusive-OR boosting boundary register (XOR BBR) operation for said bit value of said boosting boundary register to influence said bit value of said semantic register.

6. A method as claimed in claim 1, wherein said special and ordinary registers can be used as two independent register groups to store irrelevant variables if there is no speculatively executed instruction.

7. A method as claimed in claim 2, wherein said address translation circuit comprises logic gates.

8. A method as claimed in claim 2, wherein said address translation circuit comprises an XOR gate.

9. A method as claimed in claim 2, wherein said compiler includes a plurality of boosting instructions to determine said bit value of said boosting boundary register so as to then influence operation of said address translation circuit.

10. A method as claimed in claim 9, wherein said boosting instructions includes a set boosting boundary register (Set BBR) instruction.

11. A method as claimed in claim 10, wherein said set boosting boundary register instruction is placed at an original position of said boosted instruction to actuate said operation of said address translation circuit.

12. A method as claimed in claim 9, wherein said boosting instructions replace a position of a NOP (No Operation) instruction of said compiler in order not to increase an instruction parcel number.

13. A method as claimed in claim 9, wherein said boosting instructions includes a reset boosting boundary register (Reset BBR) instruction.

14. An instruction multi-level boosting method for a compiler comprising the following steps of:

providing a plurality of ordinary registers to act as destination registers for access by ordinary instructions;

boosting and speculatively executing at least one of said ordinary instructions;

providing a plurality of special registers corresponding to said ordinary registers, said special registers acting as destination registers for access by at least one boosted and speculatively executed instruction, said ordinary registers and said corresponding special registers forming a plurality of conjugate register pairs that are shadow registers with respect to each other, said conjugate register pairs being different only in one bit, said one bit being the most significant bit;

at an original position of said boosted instruction, translating an address of at least one of said ordinary registers used with said boosted instruction into an address of at least one corresponding special register with an address translation circuit; and before said translating step, determining whether said translating step should be executed with a semantic register having a plurality of bits, each of which corresponds to one of said conjugate register pairs, and a boosting boundary register having a plurality of bits, each of which corresponds to one of said conjugate register pair, each of said plurality of bits corresponding to one of said bits of said semantic register, a bit value of said boosting boundary register being utilized to influence a bit value of said semantic register.

* * * * *